Oct. 13, 1925.
E. T. FERNGREN
1,557,148
SHEET GLASS APPARATUS
Filed Dec. 26, 1924      2 Sheets-Sheet 1
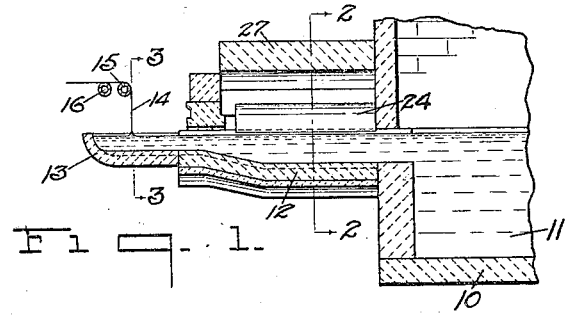
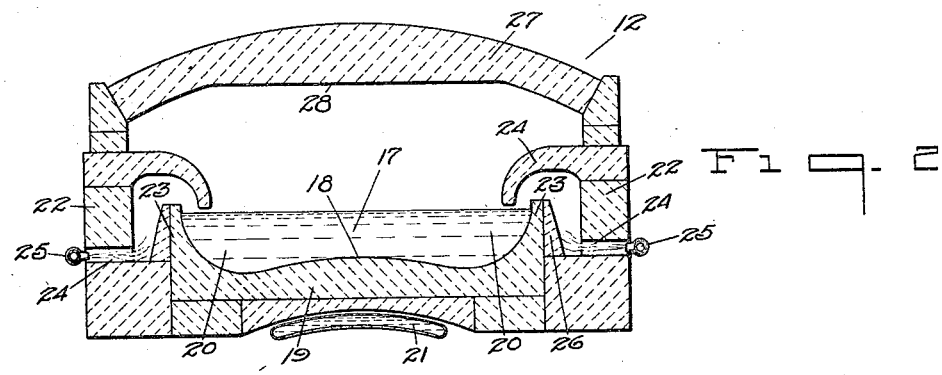
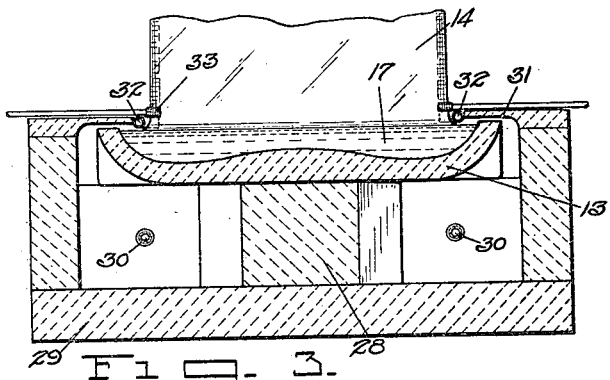
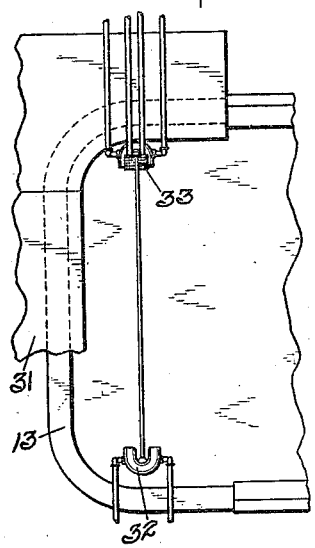
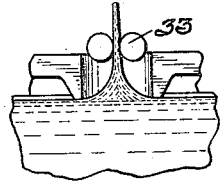
INVENTOR.
Enoch T. Ferngren.
Frank Fraser
ATTORNEY.

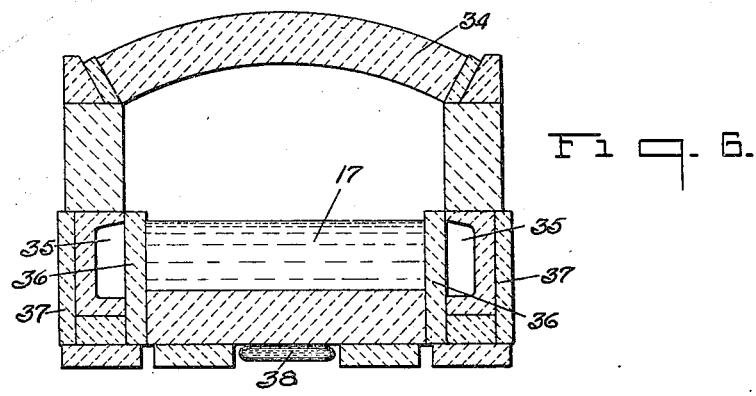
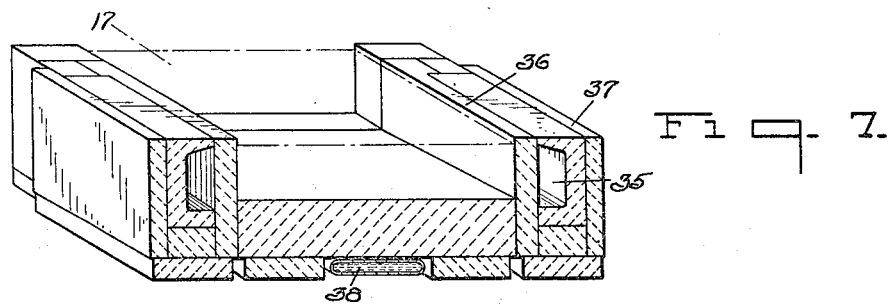
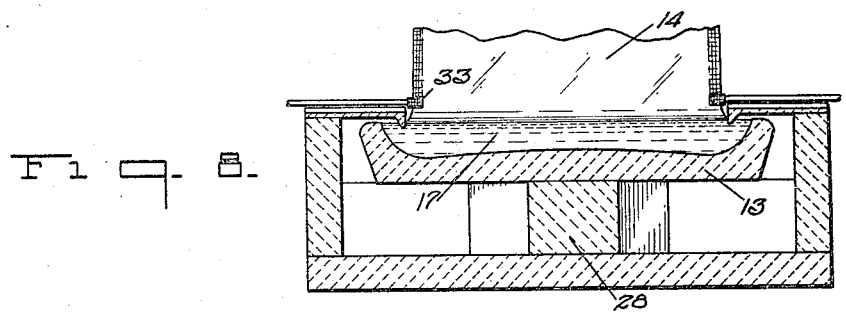
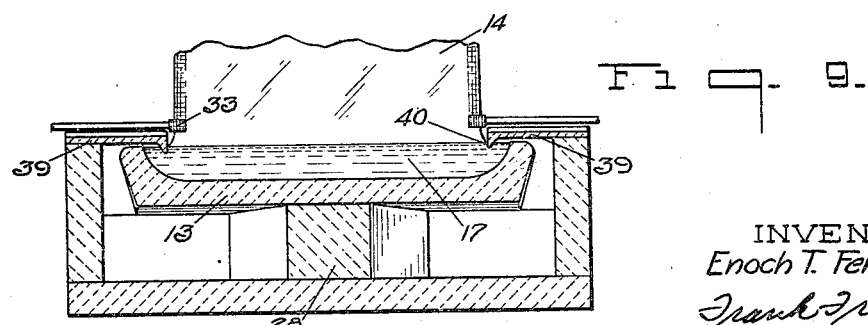

Patented Oct. 13, 1925.

1,557,148

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS APPARATUS.

Application filed December 26, 1924. Serial No. 758,133.

*To all whom it may concern:*

Be it known that I, ENOCH T. FERNGREN, a citizen of the United States, residing at Toledo, in the county of Lucas and State of Ohio, have invented new and useful Improvements in Sheet-Glass Apparatus, of which the following is a specification.

The present invention relates to a method and apparatus for producing sheet glass.

An object of the invention is to provide a method and apparatus for continuously producing sheet glass from a source of molten glass, and includes means wherein a stream of molten glass is continuously moved forward to the point of draw through suitable chambers where it is subjected to the application of heat for making uniform the flow movement and temperature of said glass from which the sheet is drawn.

Another object of the invention is to provide a method and apparatus for producing sheet glass wherein a stream of molten glass is flowed through a cooling chamber and into a draw-pot, the cooling chamber and draw-pot having means associated with the border portions for directing heat upon the border portions of the molten glass to raise the temperature thereof so that the central flow of glass and border portion of the glass will be substantially uniform.

A still further object of the invention is to provide a draw-pot and cooling chamber for use in connection with sheet glass apparatus wherein the inner bottom surface thereof is curved upwardly along the longitudinal axis, whereby to decrease the depth of the pot at the center and gradually increase the depth thereof toward the border portions where said cooling chamber and draw-pot is deepest.

Still another object of the invention is to provide a method and apparatus for producing sheet glass, said apparatus including a cooling chamber and draw-pot having means for retarding the central flow of molten glass therethrough, and having means associated with the border portions of the pot for directing heat upon the glass along said portions to raise the temperature thereof whereby the retarding of the central flow and the heating of the border portions will make the temperature of and viscosity of said glass more nearly uniform throughout its entire width, thereby improving the quality of the sheet drawn from said source of molten glass.

Other objects and advantages of the invention will become apparent during the course of the following description.

In the drawings wherein like numerals are employed to designate like parts throughout the same.

Fig. 1 is a vertical longitudinal section through a portion of the sheet glass drawing apparatus showing my improved construction of cooling chamber and draw-pot, Fig. 2 is a section on line 2—2 of Fig. 1, Fig. 3 is a section on line 3—3 of Fig. 1, Fig. 4 is a top plan view of a portion of the apparatus which may be used.

Fig. 5 is an elevation of the width maintaining apparatus employed,

Fig. 6 is a transverse vertical section through a slightly modified form of construction, Fig. 7 is a fragmentary perspective view of one form of cooling chamber, Fig. 8 is a transverse vertical section of one form of draw-pot, and Fig. 9 is a similar section of a slightly modified form of construction.

In the patent to I. W. Colburn, 1,248,809, granted Dec. 4, 1917, a sheet of glass is continuously drawn from a source of molten glass in a vertical position and is bent over a bending roll and passed off in a horizontal plane over a flattening table and through an annealing leer. The batch from which the molten glass is formed is introduced within one end of a tank furnace where an intense heat is applied thereto forming a mass of molten glass. The glass is allowed to flow through the tank furnace where it is refined at the opposite end thereof. The refined glass is then flowed through a cooling chamber where the relatively hot glass is conditioned to a state where it can be drawn from a pot which communicates with the cooling chamber in sheet form.

With this and similar types of apparatus the central flow of glass at the point of draw is relatively hotter and more fluid than the border portions because of the heat absorption caused by the sides of the cooling chamber and draw-pot, and also because of the inherent tendency of molten glass to adhere.

An object of this invention is to overcome the relatively hot central flow and relatively cool border portions by retarding the central flow and increasing or raising the temperature of the border portions of glass.

In the drawings wherein for the purposes of illustration is shown the preferred embodiment of the invention, in Fig. 1, the numeral 10 designates a tank furnace in which is disposed a quantity of molten glass 11. A cooling chamber 12 communicates with the tank furnace 10 and also a draw-pot 13. The sheet 14 is drawn from the pot 13 and is passed over the bending roll 15 and idler roll 16, as has been described. Although this particular type of apparatus is disclosed, it is to be understood that the type of drawing apparatus is not necessarily restricted to the Colburn process, as the same means for conditioning the glass may be employed in any form of sheet glass machine.

To retard the central flow of glass 17 through the cooling chamber 12 the upper surface 18 of the bottom 19 is arched upwardly as disclosed in Fig. 2 so that the molten glass 17 will be more shallow in the central longitudinal meridian than at the border portions 20. The edge volumes 20 having a greater depth and thus a greater quantity will have a tendency to remain at a relatively higher temperature than the central flow, which being retarded is more apt to lower in temperature. To assist in retarding the central flow of glass and in lowering the temperature thereof, a cooler 21 may be disposed below the center as shown in Fig. 2.

To cooperate with the arched bottom 19 the cooling chamber is constructed slightly different from the prior art structures in that the glass is flowed through a channel which is spaced from the housing walls 22 proper. The side walls 22 are arranged in spaced relation to the sides 23 of the channel through which the glass flows in said cooling chamber. Arranged above the edge portions of the cooling chamber pot and running parallel therewith are lips or arched tiles 24, being arched downwardly, and as shown in Fig. 2 terminating a slight distance above the surface of the molten glass 17. The lips or heat deflectors 24 may be carried by and supported upon the side walls 22. The side walls 22 are provided with ports 24 in which may be arranged gas burners or the like 25 for throwing a flame through the port in a manner that the heat will be permitted to pass up between the deflector block 26 and wall 22, whereby the arched lip 24 will direct the heat thus introduced downwardly upon the surface of the border portions of the glass 17. By passing the heat in this manner the sides 23 of the pot or cooling chamber are heated, thus minimizing the possibility of heat absorption thereby from the body of glass 17 contained within the cooling chamber, and also directs heat directly upon the surface of the glass.

If it is desired the cover-arch 27 may be formed as at 28 to reduce the column of heat above the central portion of the glass 17.

In Fig. 3 a similar construction is employed to maintain the heat at the uniform temperature created in the cooling chamber. The draw-pot 13 is supported upon a stool or plurality of stools 28 arranged below the pot. A pit 29 is arranged below the draw-pot and is adapted to be heated by means of gas burners or the like 30. The heat created by the gas burners 30 is applied upon the bottom of the pot to prevent a too rapid cooling of the glass 17 therein. In addition to heating the bottom of the pot the heat is permitted to pass up between the sides thereof and the sides of the pit as shown in Fig. 3. The cover-tiles 31 deflect the heat downwardly upon the glass at the edges.

Another difference lies in the fact that the sheet 14 is not drawn from the edges of the pot, but is substantially narrower than the pot from which the sheet is drawn. By heating the edge portions and making the sheet more narrow than the pot, a much more desirable sheet of glass can be continuously drawn from a source of molten glass due to the fact that differences in temperature and viscosity are reduced to a minimum.

To shield the edges of the sheet 14 substantially U-shaped coolers or other forms of shields 32 may be supported as shown in Fig. 4. Knurled rolls 33 are used as in the prior art for maintaining the sheet 14 to width after it has been drawn, although any form of sheet width maintainers may be employed.

In Figs. 6 and 7, a slightly modified form of construction is shown, wherein the heat is not applied directly to the glass along the border portion of the cooling chamber 34. In Figs. 6 and 7 a channel 35 is created adjacent the side walls 36 forming the passageway for the molten glass 17. The channel 35 is insulated by blocks 37. A flame or any form of heat may be passed through the channels 35 for keeping the sides 36 of the cooling chamber proper from absorbing heat from the edge portions of the flow of glass through said cooling chamber.

In Fig. 7 the side walls 36 of the cooling chamber are shown as forming a tapered cooling chamber wherein the wider end of the tapering cooling chamber communicates with the tank furnace, while the narrower end communicates with the draw-pot from which the sheet is drawn. A cooler 38 may be employed as shown in the drawings.

In Figs. 8 and 9 is shown a slight modification of the cover-tiles in which the cover-tiles 39 are provided with the angular extensions 40 which are submerged a slight distance in the pool of glass 17 from which the sheet is being drawn. This concentrates all of the heat upon the edge portions of the glass and prevents to a great extent stagnation and devitrification. In addition to overcoming these difficulties uniformity of temperature and viscosity is practically assured, thus making it possible to continuously draw a relatively flat and smooth sheet of glass.

The coolers 32 will absorb sufficient heat from the edges of the sheet source to build up a tractile body of glass, thus making it possible to draw a sheet from relatively hot glass.

Claims:

1. In sheet glass apparatus, including a draw-pot containing a source of molten glass, of means for directing heat along the border portions of the molten glass within said pot.

2. In sheet glass apparatus, including a draw-pot containing a source of molten glass, of means arranged along the edges of the pot for concentrating heat upon the glass contained therein.

3. In sheet glass apparatus, including a drawpot, containing a source of molten glass, of means associated with the sides of the draw-pot for directing heat currents upon the edge portions of said glass to equalize the temperature of the entire width of said source of glass.

4. In sheet glass apparatus, including a draw-pot containing a source of molten glass, of tiles arranged above the surface of the glass and along the borders thereof for directing heat downwardly upon the borders of the glass.

5. In sheet glass apparatus, including a draw-pot containing a source of molten glass, of tiles arranged above the surface of the glass and along the borders thereof for directing heat downwardly upon the borders of the glass, said tiles having a portion extending in proximity to the surface of the glass for restricting the action of said heat.

6. In sheet glass apparatus, including a draw-pot containing a source of molten glass, of tiles arranged above the surface of the glass and along the borders thereof for directing heat downwardly upon the borders of the glass, the inner edges of the tiles extending below the surface of the glass for restricting the action of said heat.

7. In sheet glass apparatus, including a draw-pot containing a source of molten glass, of means for heating the edges of said pot and the surface of the borders of the glass therein.

8. In sheet glass apparatus, including a draw-pot containing a source of molten glass, of means for heating the edges of the pot, and means arranged above the border portions of the glass contained therein for directing heat thereon.

9. In sheet glass apparatus, including a draw-pot containing a source of molten glass, means for drawing a sheet of glass therefrom, said sheet being relatively narrower than the pot, and means overlying the edges of the pot for heating the border portions of said glass.

10. In sheet glass apparatus, including a draw-pot containing a source of molten glass, means for drawing a sheet of glass therefrom, said sheet being relatively narrower than the pot, means for heating the border portions of the glass within the pot, and means for shielding the edges of the sheet being drawn.

11. In sheet glass apparatus, including a draw-pot containing a source of molten glass, said pot being relatively deeper along the edges than at the center, and means for directing heat upon the surface of the glass along the edges of the pot.

12. In sheet glass apparatus, including a draw-pot containing a source of molten glass, the edges of the pot being relatively deeper than the center, and means arranged above the pot for concentrating heat along the glass at the edges of said pot.

13. In sheet glass apparatus, including a draw-pot containing a source of molten glass, means for drawing a sheet of glass therefrom, the sheet being relatively narrower than the pot, the pot being deeper at the border portions than at the center, and means arranged above the pot for concentrating heat along the glass at the edges of said pot.

14. The process of producing sheet glass, consisting in flowing a stream of glass toward the point where the sheet is formed, and concentrating heat along the edge portions of the stream of glass.

Signed at Toledo, in the county of Lucas, and State of Ohio, this 24th day of December, 1924.

ENOCH T. FERNGREN.